United States Patent [19]

McDougald

[11] Patent Number: 5,759,412

[45] Date of Patent: Jun. 2, 1998

[54] CONTROL METHOD AND APPARATUS FOR BACKWASH OF FILTER MEDIA BED BASED WATER VOLUME IN FILTER BASIN

[75] Inventor: Mack McDougald, Ochlocknee, Ga.

[73] Assignee: United States Filter Corporation, Palm Desert, Calif.

[21] Appl. No.: 717,100

[22] Filed: Sep. 20, 1996

[51] Int. Cl.⁶ .................... B01D 24/48; B01D 24/46
[52] U.S. Cl. .................... 210/744; 210/108; 210/275; 210/793
[58] Field of Search .................... 210/86, 104, 108, 210/121, 264, 275, 276, 277, 744, 792, 793, 794, 795; 364/500, 502, 509; 73/290

[56] References Cited

U.S. PATENT DOCUMENTS

| | | |
|---|---|---|
| 2,235,227 | 3/1941 | Lose, Jr. . |
| 2,302,449 | 11/1942 | Laughlin . |
| 3,239,061 | 3/1966 | Horning et al. ............... 210/744 |
| 3,817,378 | 6/1974 | Ross ............... 210/275 |
| 3,984,326 | 10/1976 | Bendel ............... 210/275 |
| 4,133,766 | 1/1979 | Adie ............... 210/275 |
| 4,486,307 | 12/1984 | Weiler ............... 210/793 |
| 4,540,487 | 9/1985 | Johnson et al. ............... 210/264 |
| 4,617,131 | 10/1986 | Walker ............... 210/794 |
| 4,764,288 | 8/1988 | Walker et al. ............... 210/793 |
| 4,859,330 | 8/1989 | Pauwels ............... 210/264 |
| 4,957,631 | 9/1990 | Pauwels ............... 210/264 |
| 4,976,873 | 12/1990 | Ross ............... 210/744 |
| 4,988,439 | 1/1991 | Medders, II ............... 210/264 |
| 5,089,117 | 2/1992 | Nichols ............... 210/264 |
| 5,234,600 | 8/1993 | Kupke ............... 210/86 |

*Primary Examiner*—Joseph W. Drodge
*Attorney, Agent, or Firm*—Nixon & Vanderhye P.C.

[57] ABSTRACT

A control system for controlling a backwash operation in normal and high flow operating modes is provided in a traveling bridge filter having a filter basin; a filter media bed; a filtrate channel; a traveling bridge adapted to traverse the filter basin with a backwash hood suspended therefrom; a programmable logic controller; a reference sensor and five spaced water level sensors. The controller and the sensors control the backwash operation by sensor functions which differ between the normal and high flow operating modes.

10 Claims, 1 Drawing Sheet

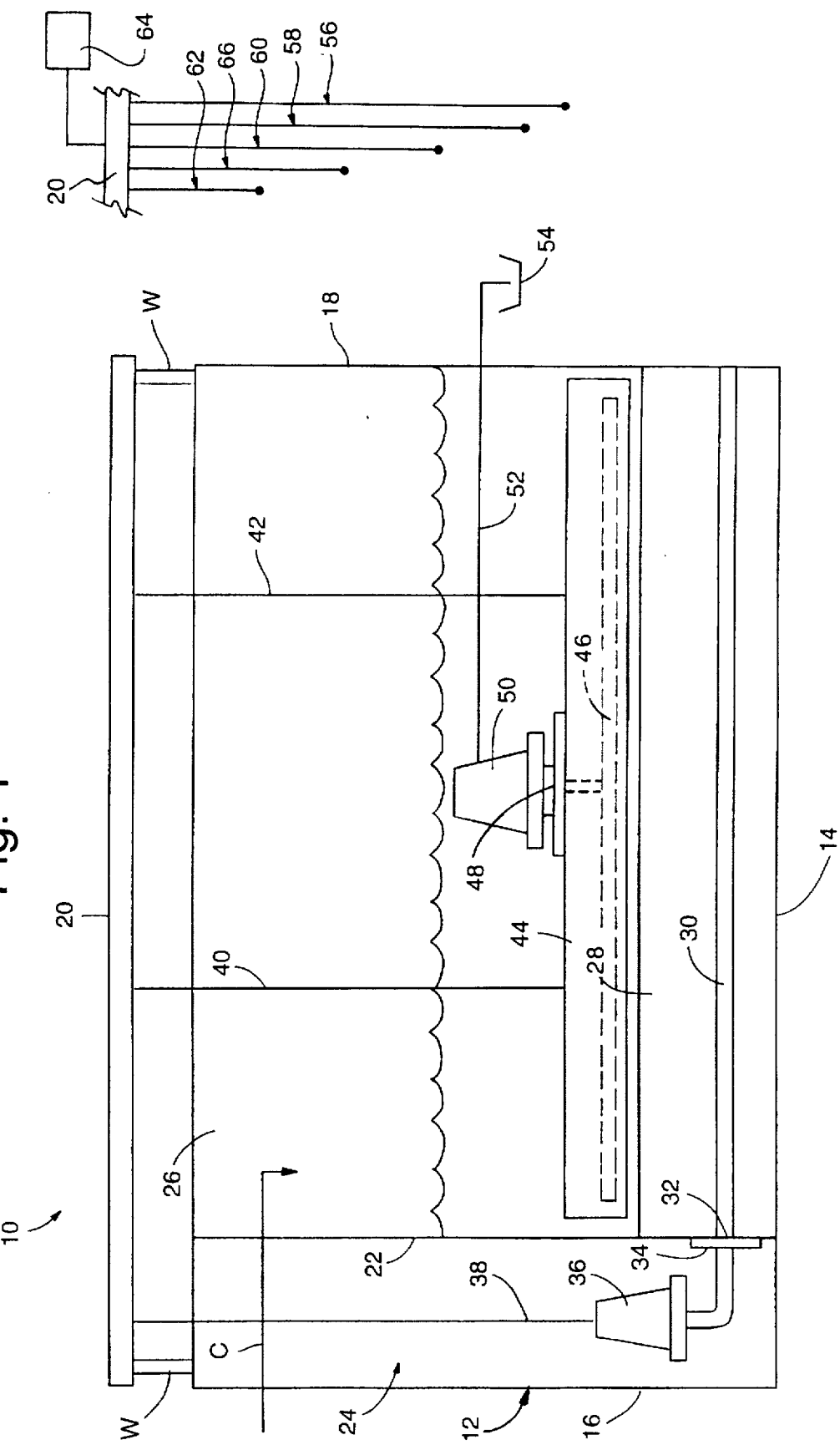

ND APPARATUS FOR
CONTROL METHOD AND APPARATUS FOR BACKWASH OF FILTER MEDIA BED BASED WATER VOLUME IN FILTER BASIN

TECHNICAL FIELD

This invention relates to travelling bridge filtration systems and, more specifically, to a control method of operating the travelling bridge filter, particularly during peak hydraulic flow or high solid loading conditions, in such a way as to reduce the amount of backwash waste water generated during the condition.

BACKGROUND OF THE INVENTION

It is well known in the art to utilize filtration tanks or basins divided into a plurality of filter cells, one adjacent the other, and all containing a multi-layer or single layer arrangement of granular filter media such as sand, gravel and the like. In a downward flow filtration system of this type, water or other liquid containing suspended solid particles is introduced into the filtration tank from above, and clarified water is drawn off from a chamber either beneath or adjacent the individual filter cells. During downward flow through the individual cells, particulate matter is entrapped within the layer or layers of granular filter media, but eventually, the particulate matter clogs the filter media, thereby reducing the filtering capability of the system. Thus, there is a need for a periodic cleaning of the filter cells. It is also known to maintain such units in continuous operation during cleaning by the use of travelling bridge devices which move from one filter cell to the next, cleaning individual cells while permitting the filtration process to continue in the remaining cells.

Examples of travelling bridge apparatus of this type may be found in U.S. Pat. Nos. 5,089,117; 4,988,439; 4,957,631; 4,859,330; 4,764,288; 4,617,131; 4,540,487; 4,486,307; 4,133,766; 3,984,326; 2,235,227; and 2,302,449. Typically, travelling bridge systems include an overhead carriage, movable along tracks, guideways or the like, which carry a backwash hood which is either successively engageable with the open upper end of each filter cell, or which passes over the filter bed in close proximity to the media surface. For a downflow type filter, backwashing is achieved by introduction of water or other treatment liquid by a backwash pump into the cell from below in a counterflow arrangement to the normal filtering direction. The backwash hood typically includes a suction head (i.e., a waste water pump) for drawing out fluid and debris forced to the surface of the filter cell as a result of the backwash. As the backwash of individual cells is completed, the travelling bridge moves the backwash hood to the next adjacent cell.

Under normal flow conditions, the filter system operates over a broad range of water level in the filter basin. Generally, a backwash cycle is initiated under normal flow conditions by a time clock programmed to initiate backwash at periods of low flow such as late at night when demand is lowest. Low flow periods are chosen for programmed backwash periods to minimize the effect of backwash wastewater recycle on the upstream processes. The system may also be backwashed at any time, however, by manual initiation. Normally, a filter will be programmed to backwash at least once per day. This is done for several reasons, most notably to remove solids accumulated during the filtering period, to prevent biological growth from occurring in the filter media, and to prevent filter media bed compaction which results from solids deposition, effects of gravity, and hydraulic head on the filter bed. Compaction of the filter media bed alone will increase the system headloss in the dosing mode.

Under normal operating conditions, the system will not reach high level, (otherwise known as terminal head loss), unless the filter is loaded heavily with solids or receives a high peak flow or some combination of the two. High solids loading typically means that the process upstream of the filter is not performing well, or is in an upset condition allowing solids to escape to the filter. High flow conditions result from abnormal operation conditions, usually resulting from storm runoff or high usage of the system, such as on major holidays. High flow conditions can cause the upstream system to discharge high levels of solids which place severe demands on the filter system and can cause the filter to reach high level or terminal headloss before the programmed backwash event. In these situations, the filter will go into backwash as a result of high water level triggering a high level sensor, e.g., an electrode.

When a filter backwashes, the backwash wastewater is returned to the upstream process for retreatment due to the high content of solids in the wastewater. Under normal conditions, the return of the backwash wastewater to the upstream process presents no problems to the system by way of added hydraulic load. Under high flow conditions or process upset, however, when the upstream system is already highly stressed, the backwash wastewater recycle compounds the problem by adding additional hydraulic load. For this reason, it is advantageous to keep the amount of backwash wastewater recycle to a minimum during high flow or process upset conditions.

In a filter equipped with a standard level control system, the filter system operates over a very broad range of water level in the filter basin, as already noted above. This is done so that the filter can operate for extended periods without backwashing, allowing the filter bed to absorb solids. The accumulated solids slowly increase the hydraulic headloss in the filter bed causing the water level to slowly rise until the backwash cycle cleans the filter bed and returns the headloss to the clean bed state.

Most systems utilize electrode level controls for controlling the backwash function. The systems normally employ four electrodes: a ground electrode, a "low water level-off" electrode, a "resume backwash" electrode and a "high water level" or maximum headloss electrode. All electrodes send an electrical signal to the backwash control system, (normally a programmable logic controller or PLC), when the water level reaches the electrode.

The electrodes are typically suspended from the bridge, each having a different vertical location within the filter basin. The ground or first electrode (i.e., closest to the bottom of the basin) accomplishes the function of providing a ground source for the other three electrodes so that their electrical signals can be received.

The "low water level-off" or second electrode (i.e., above the ground electrode but below the third electrode) serves to allow the backwash cycle to occur or to stop the backwash cycle when the water level drops below the low water level. Low water level occurs when there is not enough flow to maintain the water level in the filter. Thus, backwash may occur whenever the water level is above the "low water level-off" electrode.

The "resume backwash" or third electrode (i.e., above the second electrode but below the fourth electrode) operates only when the "low water level-off" electrode has stopped the backwash cycle before completion of the backwash cycle. When the backwash cycle is stopped during the backwash cycle, the system goes into a pause mode, and backwash will not resume until the water level returns to a level sufficient to resume backwash, i.e., reaches the level of the third or "resume backwash" electrode. This is done to prevent the backwash pumps from running dry and being damaged. The "resume backwash" or third electrode is set at a level higher than the "low water level-off" electrode to provide some storage volume of water for operation during backwash. If the "low water level-off" or second electrode were to be used to resume the backwash cycle, it could potentially cause the backwash cycle to energize and deenergize rapidly because the backwash pumps cycling on could lower the water level quickly causing a phenomenon known as "ratcheting" where the pump motors cycle on and off within seconds due to the electrodes inability to read anything other than grounded or ungrounded. The "resume backwash" or third electrode causes the control system to continue the backwash cycle after the pause mode and to continue until the cycle is complete, or until the "low water level-off" electrode again stops the cycle setting up another pause period. This operation will repeat until the backwash cycle is completed for the entire filter.

The "high water" level electrode or fourth (above the third electrode and the uppermost electrode in the basin or tank) is set to energize the backwash cycle just prior to an overflow condition in the filter basin. It will be appreciated that the distance between the "low water level-off" or second electrode and the "high level" or fourth electrode is normally considered the full operating head of the filter. When backwash is initiated by the fourth electrode, the water level in the basin or tank must drop all the way down to the "low water level off" electrode before the backwash cycle will stop or pause. In high flow situations, however, there is enough head loss through the filter media to prevent the system from reaching the low level condition, and therefore, once initiated the backwash cycle will continue until the entire filter is backwashed.

SUMMARY OF THE INVENTION

In order to reduce the amount of backwash wastewater generated during a high flow condition and recycled to the upstream process, a fifth electrode (and accompanying revision to the programming of the PLC) is utilized in order to permit a second control scheme for high flow or high solids content conditions to be implemented. In other words, the PLC now initiates a high flow operating mode when the water level reaches the "high water level" electrode, as described in greater detail below. The basis of the design in accordance with the invention is to allow the filter to operate at the upper end of the water level in the basin during high flow conditions so that the system can cycle into a pause mode without requiring the water level to drop all the way down to the normal low water level. Operation in this manner requires that the backwash cycle clean only enough of the filter bed to relieve the headloss sufficiently to allow the water level to drop slightly under the high level condition so that the minimum amount of backwash wastewater is generated during the high flow condition. This fifth electrode is not used under normal operating conditions and, when used, the remaining electrodes are also utilized differently than in normal operation, as explained further below. Thus, when the "high level" or fourth electrode is activated, the programmable logic controller or PLC will alter or shift responsibilities of the electrodes used in the normal operating mode to now operate in the high flow operating mode. In the latter mode, the normal "low water level-off" or second electrode is bypassed. The normal "resume backwash" or third electrode becomes the high flow backwash "off" electrode. The fifth electrode is activated and becomes the high flow "resume backwash" electrode. This electrode will be located vertically between the "high level" or fourth electrode and the normal "resume backwash" or third electrode.

To prevent the system from being locked into a high flow operating mode, if the water level drops below the high flow "off" electrode and remains there until programmed backwash initiation occurs, the PLC will reset the controls for operation on the normal mode until the "high level" electrode is activated again. Any activation of the "high level" electrode, even during a normal programmed backwash, will activate the high flow operation mode.

While the above discusses the use of electrodes as preferred level sensing devices, several other sensing devices could be employed such as float switches, ultrasonic level sensors, impedance type sensors, pressure switches and others.

The importance of the system is not in the manner of simply sensing water level, but in the ability to control or reduce the amount of backwash wastewater generated in high flow or process upset situations in which recycled backwash wastewater could be detrimental to the operation of the upstream process.

In accordance with its broader aspects, therefore, the present invention provides in a control method for operating a traveling bridge filter having a filter basin; a filtrate channel; a filter media bed; a traveling bridge adapted to traverse the filter basin with a backwash hood suspended therefrom; and at least one backwash pump adapted to supply backwash water in an upward direction through the filter bed; the improvement comprising a) utilizing a first plurality of water level sensors in the filter basin to control backwash start, stop and resume functions in a normal flow operating mode; and b) utilizing certain of the first plurality of water level sensors in the filter basin and at least one additional water level sensor to control backwash start, stop and resume functions in a high flow operating mode, wherein the certain of the first plurality of the water level sensors are utilized to control the functions differently in the high flow operating mode than in the normal flow operating mode.

In another aspect, the invention provides a control system for controlling a backwash operation in normal and high flow operating modes in a travelling bridge filter having a filter basin; a filter media bed; a filtrate channel; means for introducing water to be clarified into the filter basin for downward flow through the filter media bed; a traveling bridge adapted to traverse the filter basin with a backwash hood suspended therefrom and locatable closely adjacent the bed during backwash; and at least one backwash pump adapted to supply backwash water in an upward direction through the filter bed, the control system comprising a first ground or reference sensor adjacent the filter media bed; a second water level sensor located above the first sensor and adapted to stop the backwash operation when the water level drops to the second electrode in a normal flow operating mode; a third water level sensor located above the second sensor and adapted to resume the backwash operation after stopping by the second water level sensor when the water level rises to the third electrode in the normal flow operating mode; a fourth water level sensor located above the third sensor and adapted to initiate the backwash operation whenever the water level reaches the fourth electrode; and means for switching functions of the second and third sensors for utilization in the high flow operating mode whenever backwash is initiated by the fourth water level sensor such that the second water level sensor is bypassed; the third water level sensor is adapted to stop the backwash operation when the water level drops to the third electrode; and for activating a fifth water level sensor adapted to resume backwash after stoppage by the third water level sensor when the water level reaches the fifth water level sensor.

Other objects and advantages of the subject invention will become apparent from the detailed description which follows.

BRIEF DESCRIPTION OF THE DRAWINGS

FIG. 1 is a simplified cross section taken through a travelling bridge filtration unit in accordance with this invention; and FIG. 1A is a schematic diagram of the placement of electrodes or other level sensors in the filter basin shown in FIG. 1.

DETAILED DESCRIPTION OF THE DRAWINGS

With reference now to FIG. 1, a travelling bridge backwash system 10 includes a generally rectangular tank 12 of concrete (or steel) construction consisting of a bottom wall or floor 14, a pair of side walls 16, 18, and a pair of end walls (not shown). A travelling bridge 20 (illustrated essentially schematically for the sake of simplicity and convenience with many of its conventional components omitted), is mounted atop the device for movement along the tank via wheels W, in a direction parallel to the side walls 16, 18 and in the longitudinal direction of the tank. The manner in which the bridge 20 is mounted and its associated drive are conventional in the art and form no part of this invention.

The tank 12 also includes an interior partition 22, in proximity to the side wall 16 and extending parallel thereto, along the length of the tank (as defined by the end walls) between the end walls 16, 18. This partition 22 serves to divide the tank into a relatively large filter basin 26 and a relatively smaller filtrate channel 24.

The filter basin 26 is provided with a bed 28 of filter media which may comprise one or more layers of granular material, conventionally used in gravity type filtration systems. In this exemplary embodiment, the filter basin is configured as a single filter cell (also see FIG. 2), without the conventional vertically oriented dividers which are otherwise used to divide the filter basin into a plurality of individual cells (running parallel to the end walls, transversely between partition 22 and side wall 18). In a typical installation, water to be cleaned is introduced into the filter basin via conduit C for downward flow through the media bed 78.

Within the filter media bed 28, and in proximity to the bottom wall or floor 14, there are arranged a plurality of underdrain headers 30 extend in laterally spaced relationship along the length of the basin 26, at a substantially uniform height within the filter bed media. Each tubular header 30 is supported at opposite ends by the side wall 18 and partition 22 by suitable means. Thus, it will be appreciated that the headers 30 extend transversely of the filter basin length, and parallel with the hood 34.

The end of each header 30 closest the side wall 18 is closed, while the opposite end opens through the partition 22 at a port 32.

Filtrate from the basin 26 will flow through the headers 30 and port 32 into the filtrate channel 24. For backwash, filtrate is reverse flowed through the headers 30 for upward flow through the media bed. Thus, The port 32 associated with each header 30 is designed to be selectively engaged by a backwash sealing shoe 34 which, in turn, connects to a main backwash pump 36. The latter is secured to the bridge 20 by one or more braces 38 (or other suitable means) for movement therewith along the length of the tank 12 adjacent the partition 22.

Suspended from the bridge 20 by struts 40, 42 is a backwash hood 44 which also extends transversely of the tank, substantially between the partition 22 and side wall 18 and in close proximity to the bed 28. The hood 44 encloses a backwash header 46 which is connected to an inlet 48 of a waste water pump 50 mounted externally of the hood 44. A discharge conduit 52 runs to a stationary backwash trough 54 which runs substantially the length of the tank. In this way, the outlet of the discharge conduit 52 can travel freely within the trough 54 as the bridge 20 travels the length of the tank 12. It will be appreciated that the pump 50 may also be mounted on the bridge 20. It will also be appreciated that the hood 44 is mounted for vertical movement (by any suitable means) relative to the bridge 20, toward and away from the bed 28. During backwash, the hood is moved downwardly to within about an inch (1") of the media.

Conventional systems of the type shown generally in FIG. 1 normally employ four electrodes, numbered 56, 58, 60, and 62 as shown in FIG. 1A. The electrodes are shown in the proper vertical orientation vis-a-vis the filter basin 26, but are shown laterally removed simply for the sake of clarity and ease of understanding. The electrodes are, in fact, suspended from and move with bridge 20. These include a ground or first electrode 56, a "low water level-off" or second electrode 58, a "resume backwash" or third electrode 60, and a "high water level" (or maximum headloss) or fourth electrode 62. Each of these electrodes sends an electrical signal to the backwash control system, which a programmable logic controller or PLC 64, when the water level in the filter basin 26 reaches the respective electrodes, and specifically the second, third or fourth electrodes 58, 60 and 62.

The "low water level-off" electrode 58 allows the backwash cycle to occur until the water level drops below a predetermined low water level which is that level when there is not enough flow to maintain the water level in the filter. In other words, backwash may occur only when the water level is above the "low water level-off" electrode 58.

The normal "resume backwash" or third electrode 60 operates only when the low water electrode has halted backwash cycle prior to completion of the cycle for a particular section of the filter media bed. Thus, when backwash is halted prior to completion of the cycle, the system goes into a pause mode, and backwash will not resume until the water level returns to a sufficiently high level, i.e., until the water reaches the higher level of the "resume backwash" electrode 60. When the water level reaches the "resume backwash" electrode 60, the control system resumes backwash and continues until the cycle is completed, or until the "low water level-off" electrode 58 again halts the cycle, setting up another pause mode. This operation will repeat itself until the backwash cycle is completed.

The "high water level" or fourth electrode 62 is set to commence the backwash cycle just prior to an overflow condition in the filter basin 26. It will thus be appreciated that the vertical distance between the low water level "off" electrode 58 and the "high water level" electrode 62 is normally considered as the full operating head of the filter. Once backwash is initiated by the "high water level" electrode 62, the water level must drop all the way down to the "low water level-off" electrode 58 before the backwash cycle will stop or be put into a pause mode. In high flow situations, there is enough headloss through the filter media to prevent the system from reaching the low level condition, and therefore, once initiated, the backwash cycle will continue until the entire filter is backwashed. It should be noted here that for pre-timed or manually initiated backwash during normal flow conditions, it is typically the case that the water level remains between electrodes 58 and 62 and, thus, none of the electrodes 58, 60 or 62 come into play in the sense of being activated to start, stop or resume backwash. The invention here relates to extremes where the water level is too high or too low, and especially where the water level rises due to increased flow or increased solids content to the terminal head loss level, thus activating electrode 62 as described above.

In accordance with the present invention, an alternative high flow operating mode is used which employs a fifth high flow condition electrode 66 along with appropriate reprogramming of the PLC 64. This fifth electrode 66, is not used under normal operating conditions. However, when the "high level" electrode 62 is activated, the programmable logic controller or PLC 64 shifts the responsibilities of the electrodes used in the normal operating mode to new responsibilities in connection with the high flow operating mode. More specifically, in the high flow operating mode in accordance with this invention, the normal "low water level-off" electrode 58 is bypassed, and the normal "resume backwash" electrode 60 becomes the high flow condition backwash "off" electrode. In addition, the fifth electrode 66 serves as the high flow condition "resume backwash" electrode. The latter is set at a length between the "high level" electrode 62 and the high flow condition "off" or normal flow condition "resume backwash" electrode 60. In the above arrangement, and already noted above, the PLC 64 is programmed to shift to the high flow condition control mode whenever the water level reaches the "high water level" electrode 62. Backwash is halted if the water level reaches the high flow condition "off" electrode 60 before the cycle is completed. If the high flow condition "resume" backwash electrode 66 will cause the backwash operation to resume when the water level reaches the electrode 66, and backwash continues until the cycle is completed.

With this alternative high flow condition control or operating mode, the backwash cycle cleans only enough of the filter bed to relieve the headloss sufficiently to allow the water level to drop only slightly under the high flow condition level, and therefore, only a minimum amount of backwash water is generated during the high flow condition. In order to prevent the system from being locked into this high flow operation mode, if the water level drops below the high flow condition "off" electrode 60, and remains there until programmed backwash initiation occurs, then the PLC 64 will reset the controls for operation in the normal mode until such time as the "high level" electrode 62 is activated. Any activation of the "high lever" electrode 62, even during a normal programmed backwash, will activate the high flow condition operation mode.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a control method for a backwash operation in a traveling bridge filter having a filter basin; a filtrate channel; a filter media bed; a traveling bridge adapted to traverse the filter basin with a backwash hood suspended therefrom; and at least one backwash pump adapted to supply backwash water in an upward direction through the filter bed during backwash operation; the improvement comprising:

a) utilizing a first plurality of water level sensors in said filter basin to control backwash operation start, stop and resume functions in a normal flow operating mode; and b) utilizing certain of said first plurality of water level sensors to said filter basin and at least one additional water level sensor to control backwash start, stop and resume functions in a high flow operating mode, wherein said at least one additional water level sensor is by passed in said normal flow operating mode and at least one of said first plurality of water level sensors is bypassed in said high flow operating mode.

2. The method of claim 1 wherein said plurality of water level sensors include a first ground electrode adjacent said filter media bed.

3. The method of claim 2 wherein said first plurality of water level sensors includes a second electrode located above said first electrode and adapted to stop the backwash operation when the water level drops to said second electrode in the normal flow operating mode.

4. The method of claim 3 wherein said first plurality of electrodes includes a third electrode located above said second electrode and adapted to resume the backwash operation after stoppage by said first electrode and when the water level rises to said third electrode in the normal flow operating mode.

5. The method of claim 4 wherein said first plurality of electrodes includes a fourth electrode located above said third electrode and adapted to initiate the backwash operation whenever the water level reaches said fourth electrode.

6. the method of claim 5 wherein said at least one additional water level sensor comprises a fifth electrode located vertically between said third and fourth electrode.

7. The method of claim 6 wherein, in the high flow operating mode, said second electrode is bypassed; said third electrode is adapted to stop the backwash operation when the water level drops to the third electrode; and said fifth electrode is adapted to resume the backwash operation after stoppage by said third electrode and when the water level rises to the level of the additional electrode.

8. The method of claim 7 wherein means are provided for switching functions of said second, third and fifth electrodes for use in said normal flow and high flow operating modes.

9. In travelling bridge filter having a filter basin; a filter media bed; a filtrate channel; means for introducing water to be clarified into said filter basin for downward flow through said filter media bed; a traveling bridge adapted to traverse the filter basin with a backwash hood suspended therefrom and locatable closely adjacent said bed during backwash operation; and at least one backwash pump adapted to supply backwash water in an upward direction through the filter bed, a control system comprising:

a first ground or reference sensor adjacent said filter media bed;

a second water level sensor located above said first sensor and adapted to stop the backwash operation when the water level drops to said second electrode in a normal flow operating mode;

a third water level sensor located above said second sensor and adapted to resume the backwash operation after stopping by said second water level sensor when the water level rises to said third electrode in the normal flow operating mode;

a fourth water level sensor located above said third sensor and adapted to initiate the backwash operation whenever the water level reaches said fourth electrode; and means for switching functions of said second and third sensors for utilization in the high flow operating mode whenever backwash is initiated by the fourth water level sensor such that said second water level sensor is bypassed; said third water level sensor is adapted to stop the backwash operation when the water level drops to the third electrode; and for activating a fifth water level sensor adapted to resume backwash after stoppage by said third water level sensor when the water level reaches said fifth water level sensor.

10. The system of claim 9 wherein said first, second, third, fourth and fifth water level sensors comprise electrodes suspended from said bridge.

* * * * *